United States Patent [19]

Gorniak

[11] 4,029,077
[45] June 14, 1977

[54] SOLAR ENERGY COLLECTOR

[76] Inventor: Jerry Gorniak, 2317 E. 43rd St., Erie, Pa. 16510

[22] Filed: June 13, 1975

[21] Appl. No.: 577,259

[52] U.S. Cl. .............................. 126/271; 350/167
[51] Int. Cl.² ........................................... F24J 3/02
[58] Field of Search .......... 126/270, 271; 350/167; 60/641

[56] References Cited

UNITED STATES PATENTS

| 1,672,750 | 6/1928 | Christiansen | 126/271 |
| 3,018,313 | 1/1962 | Gattone | 350/167 |
| 3,822,692 | 5/1973 | Demarest | 126/271 |

FOREIGN PATENTS OR APPLICATIONS 653,295   2/1963   Italy ..................... 126/270

Primary Examiner—Kenneth W. Sprague
Assistant Examiner—James C. Yeung

[57] ABSTRACT

A solar collector having a hollow, pyramidical-shaped body made of insulation material and a fluid conducting coil of tubing extending around the inside of the body. A plurality of sheets of rigid material support alternate layers of liquid and of lenses which focus sunlight onto the liquid and onto the coils of tubing thereby heating the liquid. The liquid in the coils is connected in series with the liquid supported on the sheets so that liquid can be withdrawn from the ends of the coils and passed through a battery for storing the heat or otherwise supported and stored. The collector also includes an infrared absorber.

12 Claims, 10 Drawing Figures

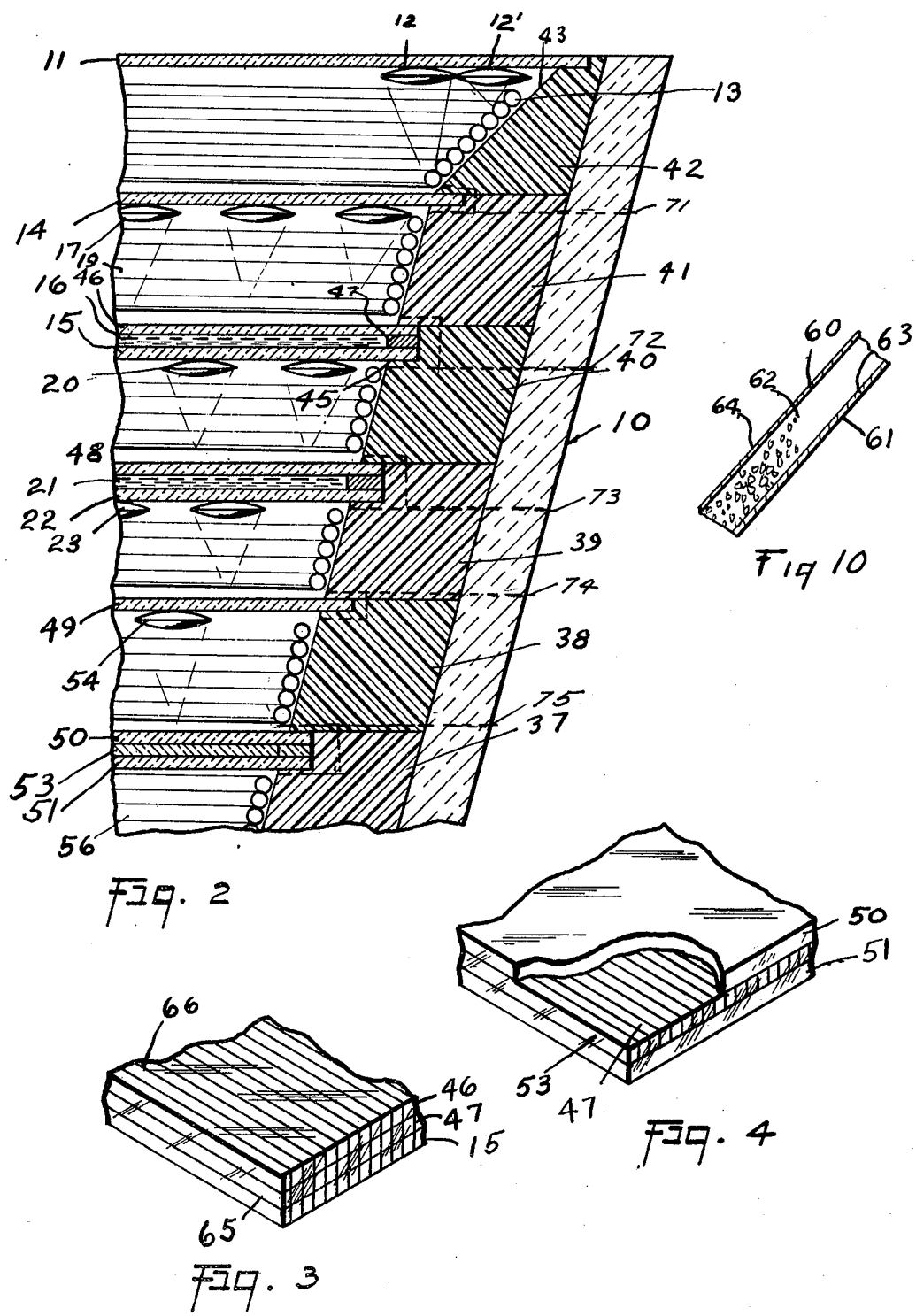

SOLAR ENERGY COLLECTOR

REFERENCE TO PRIOR ART

Various solar batteries have been made as shown in patent numbers 3,104,210; 3,171,403; 3,446,119; 3,493,491 and 3,780,722, for example, but none of these patents show the idea of focusing the sunlight on layers of liquid, such as disclosed in the present application.

OBJECTS OF THE INVENTION

It is an object of the invention to provide an improved solar energy collector.

Another object of the invention is to provide a solar energy collector that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWING

FIG. 2 is a longitudinal cross-sectional view of the solar collector.

FIG. 3 is an enlarged corner view of one of the rigid sheets supporting the liquid with a coil of copper wire wrapped around the sheets, or molded into the sheets.

FIG. 4 is a view similar to FIG. 3 showing one corner in an enlarged cross section.

FIG. 10 shows a cross sectional view of a head absorbing sheet.

DETAILED DESCRIPTION OF DRAWINGS

Figure 1:
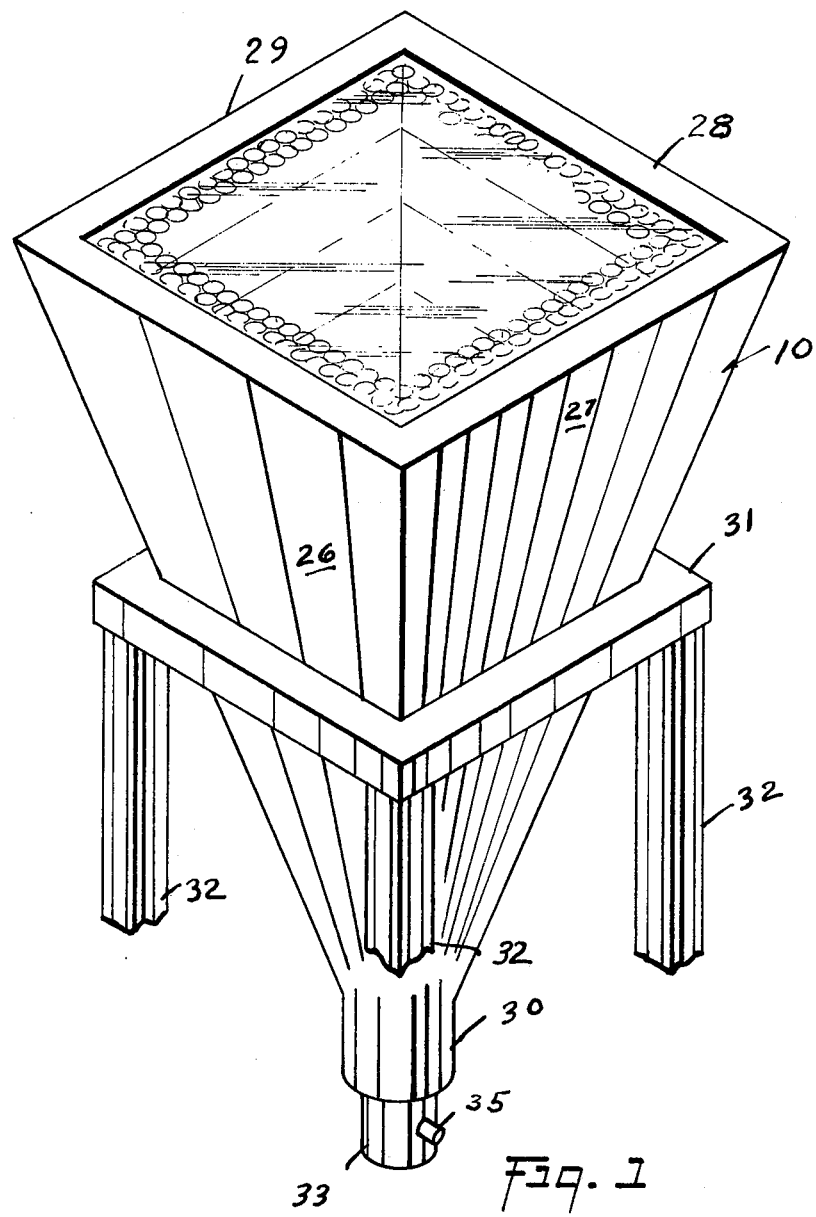
FIG. 1 is an isometric view of the solar collector according to the invention.
Figure 5:
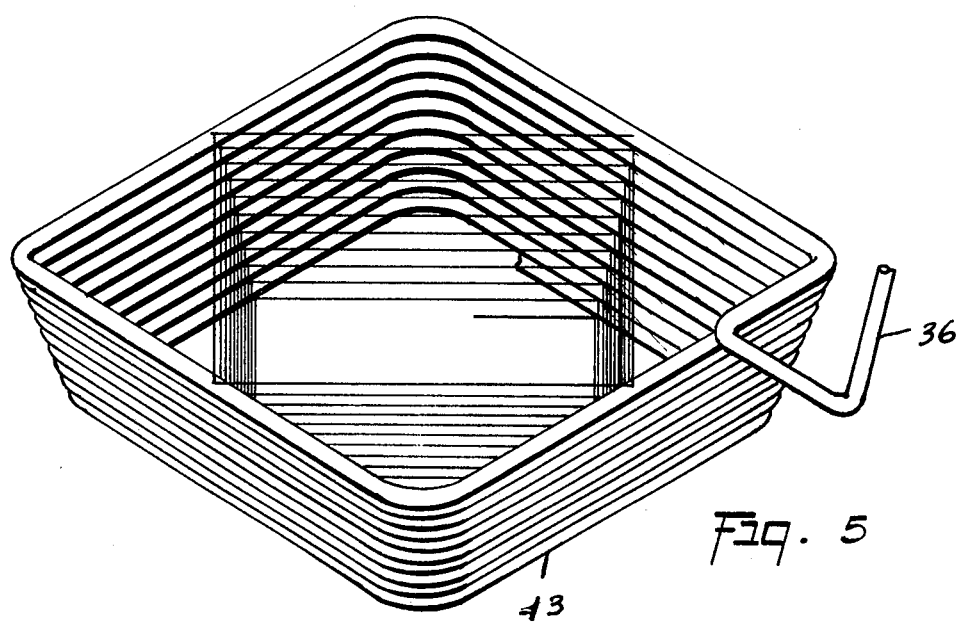
FIG. 5 is an enlarged view of one of the coils of the collector showing copper wire supported on it.
Figure 6:
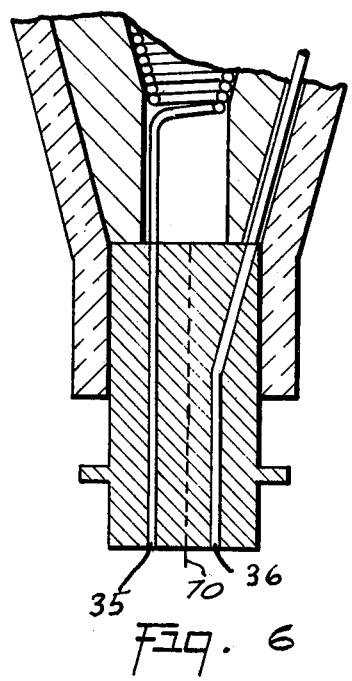
FIG. 6 is a longitudinal cross sectional view of the lower end of the collector body.
Figure 7:
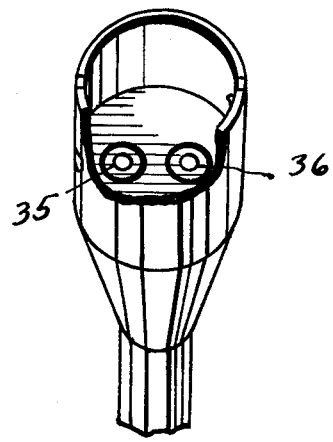
FIG. 7 is an enlarged view of the plug in the lower end of the collector body.
Figure 8:
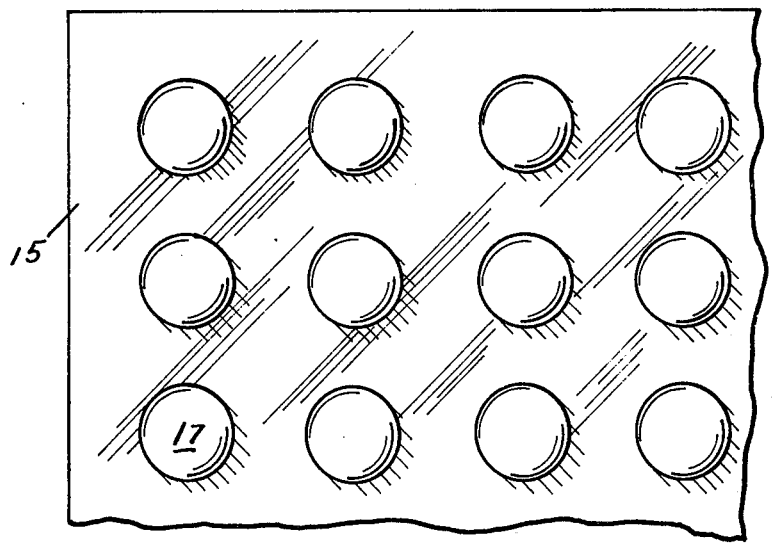
FIG. 8 is a top view of the upper rigid sheet showing the lenses supported according to the invention.
Figure 9:
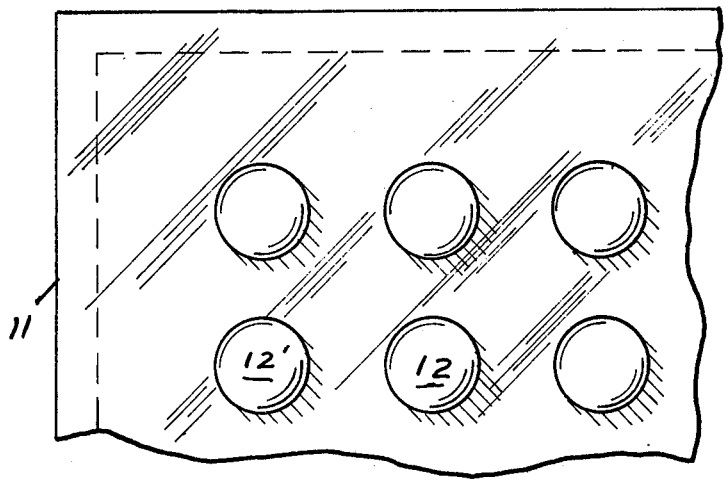
FIG. 9 is a view showing the rigid sheet which supports a layer of liquid in the collector with lenses supported on its lower side.

Now with more particular reference to the drawings, the solar collector indicated generally at 10 has a body that is in a shape of an inverted hollow pyramid and is supported on the frame 31 having legs 32, for example, and the side 26, 27, 28 and 29 defind the pyramidrical body having an apex 30 terminating in open end 33. The body includes support frames 37, 38, 39, 41 and 42 stacked and supported in it. The upper layer 42 has an inclined surface 43 on which the first copper coil 13 rests. The first copper coil 13 receives energy from the sun through and around the first two rows of lenses 12 and 12', which are attached at their centers to the first rigid sheet 11. Lenses 12 and 12' are focused on the coil 13, however; lenses 12' have a shorter focal length than the lenses 12. A second rigid sheet 14 rests on the shoulder 44 at the inner edge of the frame 41. The frames 37, 38, 39, 40, 41 and 42 are generally rectangular and open at the center and receive the coils of copper tubing. Rigid support plates set between the frames.

The third rigid sheet 15 is supported on the second shoulder 45 and the sheet of water 16 is disposed between the third sheet 15 and the upper sheet 46. A filler strip 47 extends around the outside of the sheets 15 and 46 and forms a closure for the sheet of liquid 16 received therebetween. The sheet of liquid 16 can be water, alcohol, mineral oil or any other suitable liquid material for absorbing heat from the sun's rays that are directed on it by lenses 17, or by cooling them by convection. Lenses 17 have a focal length suitable for focusing on liquid 16. The sheets 15, 11, 14, 46, 48, 49, 50, 51, and 53 will be made of rigid transparent material such as glass. The sheets of water 21, 16 will be disposed between the several rigid sheets. The first lenses 12 and the second lenses 17, third lenses 20, and fourth lenses 23 and fifth lenses 54, will all be made of conventional lens material such as glass or suitable plastic material having the desired characteristics. Instead of supporting the lenses on the rigid sheets, the lenses could be molded from a single sheet of plastic with the spaces between them formed in the shape of webs. It will be noted that the second lenses 17 of the collector are supported with the center line through these lenses, extending through the space between the lenses in the layer above them so each layer of lenses absorbs some of the sunlight that is missed by the row of lenses above.

The first lenses 12 are supported at their midpoints to the first rigid sheet 15 and forms two rows of lenses adjacent the periphery of sheet 11, primarily focusing sunlight onto the first coil of tubing 13. The second lenses 17 are fixed to the second rigid sheet 14 at their midpoints and lenses 17 focus sunlight onto the sheet of water 16 supported between the rigid sheet 15 and the rigid sheet 46.

The third lenses 20 are fixed at their midpoints to the edge of rigid sheet 15 and lenses 20 focus the sunlight that passes between the spaces between the lenses 17 onto the sheet of water 21, supported on the fourth rigid sheet 22. The second coil 19 rests on the frame 41 between the sheets 14 and 46 and it receives some of the sunlight from the outer row of lenses 17. The fourth lenses 23 are fixed to the lower side of the fourth rigid sheet 22 and they focus light missed by the sheets above onto the sheet 49 below them. The fifth row of lenses 54 are fixed to the lower side of the transparent rigid sheet 49 and they focus sunlight onto the sheet 53, which is wrapped with copper wire and also onto the coil 56 at the lower part of the body. Lenses 20 and 23 could be sandwiched between sheets 15 and 46 and between sheets 22 and 48 respectively. Rigid sheet 49 can be wrapped with wire like sheets 15, 46, and 47.

It will be noted that the coil 56 is connected in series with the terminal 35 and the terminal 35 will be connected in series with the several layers of water in the body so that the warmed liquid can be removed from the terminal 36 and passed through a suitable storage battery such as a tank of water or the like, whereby the heat can be stored for significant periods of time.

The upwardly facing surface 43 of the frame 42 and the corresponding surface of each of the other frames, is two aluminum sheets 60 and 61 held in spaced relation to each other by the styrafoam granules 62. The surface of the sheet 60 is black to make a good radiation absorber and the surface 63 of the aluminum 61 is of a reflecting surfact thus, the surface 64 will absorb infrared radiation and the tubing 13 will be heated thereby.

The rigid plates 22 and 48 are wound with copper wire 65 and 66. This wire may be wound. A row of lenses 12 will have a longer focal length than the row of lenses 12' so that both lenses 12 and 12' are focused on the coils 13. All the plates 50, 51 and 53 and the plates 22 and 48 are wrapped with wire 47 to give additional heat and cooling absorbing properties to the structure.

The collector can be used for cooling by passing air through opening 70, and 33 to flow upward through bypasses indicated at 71, 72, and 73. These bypasses will be made sufficiently large to accommodate the desired air flow. Louvers can be provided to take air off at any desired point 71, 72, 73, 74 or 75.

The collector disclosed herein can be connected to present heating and cooling equipment.

The size of the lenses can be varied to accommodate the desired configuration.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A solar collector comprising a fluid path for a liquid having a plurality of turns disposed generally in a hollow pyramidial body,
   a plurality of first lenses,
   a first sheet means supporting said lenses,
   said first lenses having spaced from them a first fluid path for liquid,
   said first fluid path for liquid being disposed a distance substantially equal to the focal length of said first lenses,
   means to conduct said liquid from said fluid path to a heat battery,
   said fluid path comprising a first coil of tubing,
   a second sheet of rigid material disposed generally parallel to said first sheet,
   and a third sheet of rigid material spaced from said second sheet generally parallel to said first sheet of material supporting a sheet of water,
   a plurality of second lenses fixed to said second sheet of material to the underside thereof,
   said second lenses being spaced from said sheet of water a distance substantially equal to the focal length of said second lenses.

2. The collector recited in claim 1 wherein said first and second lenses are fixed to said first sheet and said second sheet of material respectively at the midpoint of said lenses.

3. The collector recited in claim 2 wherein said third sheet has a fourth sheet supported thereon and disposed in fixed relation thereto in defining a space for said sheet of water therebetween.

4. The collector recited in claim 3 wherein a second coil of tubing is disposed around the inside of said collector between said first sheet of rigid material and said second sheet of rigid material.

5. The collector recited in claim 4 wherein a third lens means is fixed to said third sheet,
   a second sheet of water is disposed on said third sheet in spaced relation to said second sheet,
   said third lenses being focused on said second sheet of water.

6. The collector recited in claim 5 wherein a fourth rigid transparent sheet supports second sheet of water,
   and plurality of fourth lenses are fixed to said third sheet,
   and a third coil is disposed adjacent to periphery of said third sheet.

7. The collector recited in claim 6 wherein the fourth coil is disposed around the periphery of said fourth rigid sheets.

8. The collector recited in claim 7 wherein said collector has a body generally in a shape of an inverted hollow pyramid having an apex and a third coil is disposed in said apex for receiving the radiation from said lenses.

9. The collector recited in claim 8 wherein said body is open at its apex,
   and a closure is provided in said open end,
   said closure having terminal tubes connected to said tubes in said collector, and connected to said sheet of water whereby said tubes and said sheets of water are connected in series.

10. The collector recited in claim 1 wherein said first lenses are arranged in two rows around the periphery of said collector.

11. The collector recited in claim 7 wherein a copper wire is wound around said rigid plates.

12. The collector recited in claim 11 wherein one said layer has at least one row of said lenses attached thereto adjacent to the outside edges thereof.

* * * * *